(12) United States Patent
Verhulst et al.

(10) Patent No.: US 6,796,204 B2
(45) Date of Patent: Sep. 28, 2004

(54) ROTARY CUTTERBAR GEAR HOUSING HAVING SUPPORT FOR PINION GEAR

(75) Inventors: Michael Joseph Verhulst, Ottumwa, IA (US); John Gregory Petersen, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/302,161

(22) Filed: Nov. 20, 2002

(65) Prior Publication Data

US 2004/0093981 A1 May 20, 2004

(51) Int. Cl.$^7$ .................. A01D 34/03; A01D 34/44; A01D 34/66; F16H 33/00
(52) U.S. Cl. ......................... 74/640; 56/13.6
(58) Field of Search ...................... 74/640; 56/13.6, 56/14.7, 16.7, 16.9, 17.5; 475/348

(56) References Cited

U.S. PATENT DOCUMENTS

| | | | | |
|---|---|---|---|---|
| 4,157,004 A | * | 6/1979 | van der Lely | 56/13.6 |
| 4,426,828 A | * | 1/1984 | Neuerburg | 56/13.6 |
| 4,497,161 A | * | 2/1985 | Vissers et al. | 56/13.6 |
| 4,815,262 A | * | 3/1989 | Koch et al. | 56/13.6 |
| 4,838,014 A | * | 6/1989 | Koch et al. | 56/13.6 |
| 5,012,635 A | | 5/1991 | Walters et al. | 56/13.6 |
| 5,111,644 A | * | 5/1992 | van der Lely | 56/13.6 |

* cited by examiner

Primary Examiner—Tisha Lewis

(57) ABSTRACT

The pinion gears of a rotary cutterbar equipped with a parallel-series arrangement of idler gears and pinion gears includes a pinion gear support pad formed integrally with the bottom wall of the gear housing and located in close relationship to a bottom surface of the pinion gear so as to prevent the latter from moving, once bearing wear or loosening of mounting hardware has occurred, to the extent that rolling elements of a bearing arrangement supporting the pinion drive shaft are permitted to fall out into the gear housing and cause additional damage to the gearing located in the housing.

8 Claims, 2 Drawing Sheets

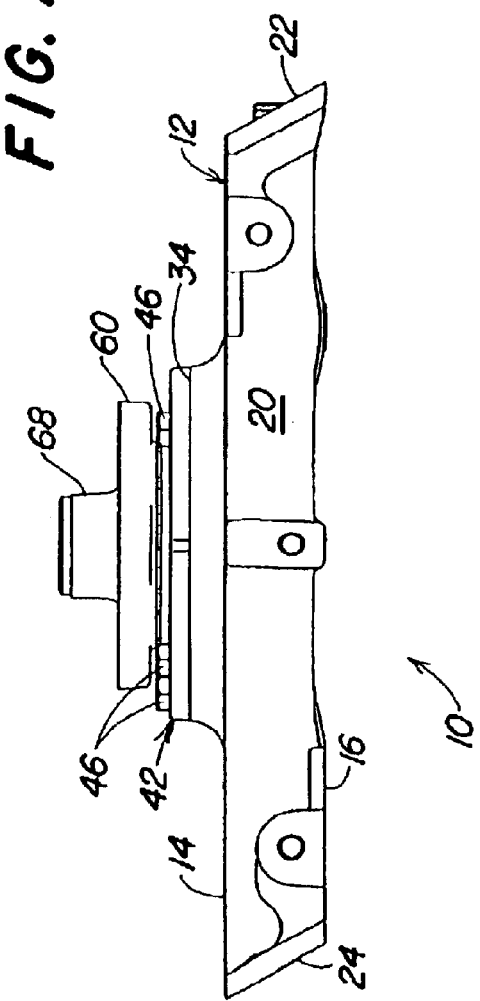
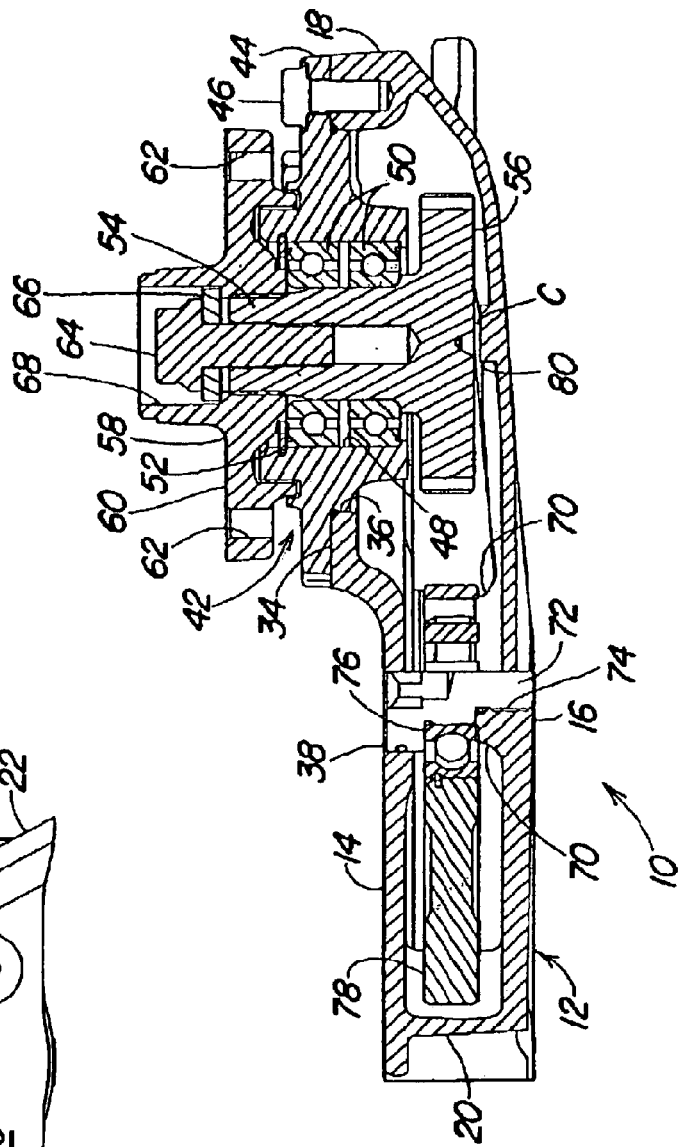

ROTARY CUTTERBAR GEAR HOUSING HAVING SUPPORT FOR PINION GEAR

FIELD OF THE INVENTION

The present invention relates to rotary cutterbars and, more particularly, relates to a relationship between the cutterbar gear housing and gearing contained therein.

BACKGROUND OF THE INVENTION

The cutterbar of a rotary disk mower includes an elongate flat housing containing a spur gear train which is lubricated by oil contained in the housing and drives the respective pinions of the individual cutting disk units. The pinion gears of the cutting units are each integral with a vertical shaft and form a pinion assembly mounted to a top wall of the housing by a bearing assembly.

These bearing assemblies may be caused to fail due to the cutting knives impacting rocks, low oil level in the cutterbar, seal damage, bearing fatigue, and other failure modes. When the pinion gear bearing fails, the pinion gear can tilt or drop down in the cutterbar housing allowing rolling elements of the bearing to fall into the housing. These loose pieces can get into the pinion and idler gears and cause major secondary damage to the gear teeth.

U.S. Pat. No. 5,012,635, granted 7 May, 1991, discloses a rotary cutterbar of the above-described type.

SUMMARY OF THE INVENTION

According to the present invention, there is provided an improved rotary cutterbar constructed so as to overcome the above-noted drawback of secondary damage to the gears when a pinion shaft support bearing fails.

An object of the invention is to provide a support located for preventing any substantial downward movement of the pinion shaft permitted by a bearing failure.

A more specific object of the invention is to provide a support, as set forth in the preceding object, which is formed as an integral part with the gear housing.

These and other objects will become apparent from a reading of the ensuing description together with the appended drawings.

BRIEF DESCRIPTION OF THE DRAWINGS

FIG. 2 is a rear view of the cutterbar module of FIG. 1.

FIG. 3 is a vertical sectional view taken along lines 3—3 through the cutterbar module of FIG. 1.

DESCRIPTION OF THE PREFERRED EMBODIMENT

Figure 1:
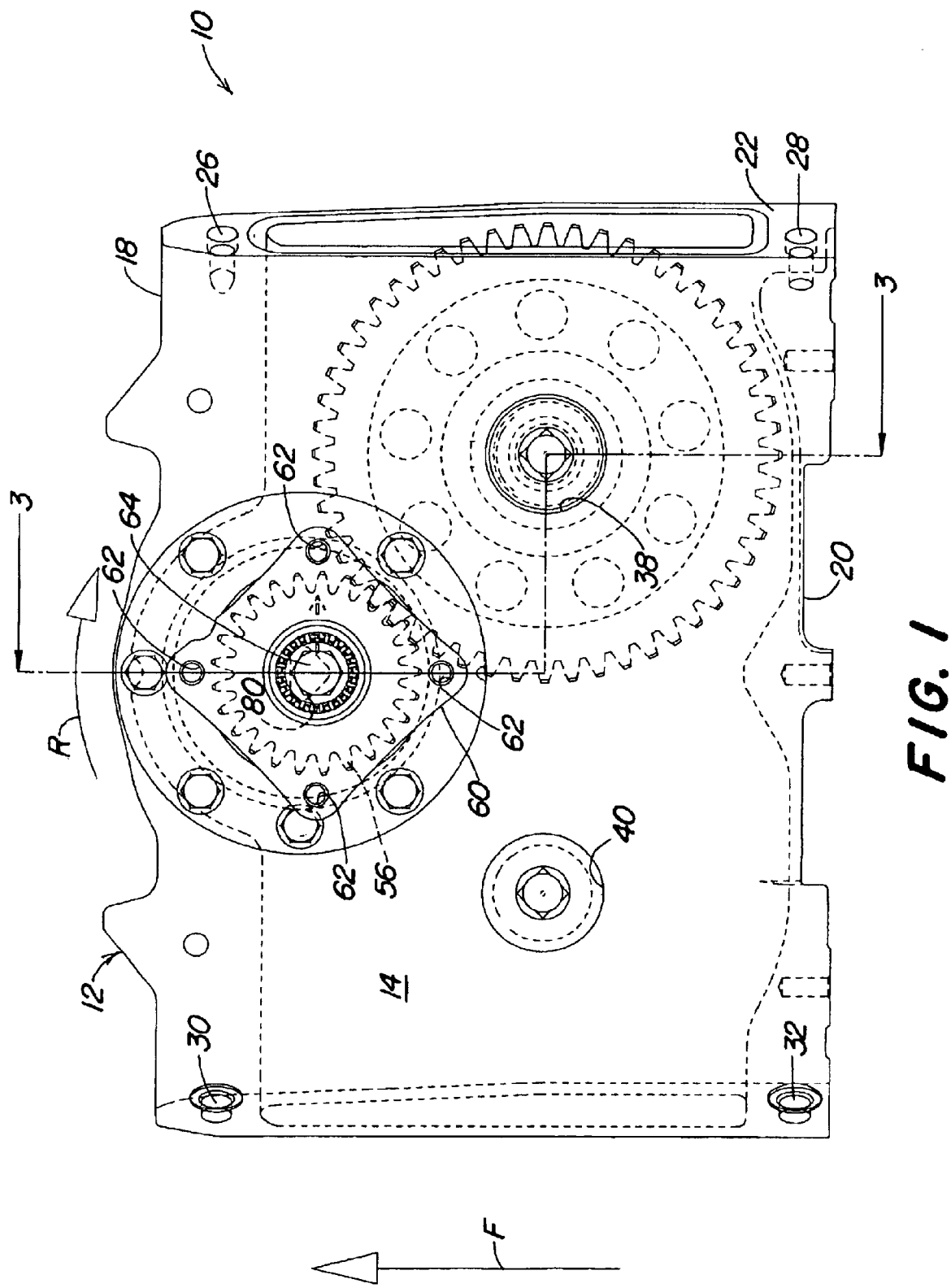
FIG. 1 is a top view of a rotary cutterbar module set up as an end cutting unit of the cutterbar, but being shown with the cutting disk removed for the sake of clarity.

Referring now to FIGS. 1 and 2, there is shown a cutting unit module 10 of a rotary cutterbar, which may be formed by connecting a plurality of modules in side-by-side relationship to each other so as to result in a flat or low profile tube. The arrow F indicates the forward direction of operation, and terms such as "right-hand" and "left-hand" are considered from the perspective of a viewer standing behind the cutterbar and facing in the direction of forward operation. The module 10 includes a housing 12 having top, bottom, front, and rear walls 14, 16, 18, and 20, respectively. Right- and left-hand ends of the housing 12 define respective planar surfaces 22 and 24 which are parallel to each other and are inclined to the left from top to bottom. The right-hand surface 22 is adapted for having a complementary shaped left-hand surface of a second module (not shown) to be bolted in sealed, face-to-face engagement therewith through the agency of stud bolts inserted through mounting holes provided in the second module and aligned with front and rear threaded openings 26 and 28, respectively, of the module 10. The module 10 is set up for being used as a leftmost module of the cutterbar and would have a left-hand end cap (not shown) having a mounting surface shaped complementary to and adapted for being clamped into sealing engagement with the left-hand planar surface 24 of the module 10 through the agency of a pair of stud bolts inserted through front and rear mounting holes 30 and 32, respectively, of the module 10 and received in aligned threaded holes provided in the end-cap.

A forward central location of the top wall 14 is provided with a raised cylindrical pad 34 containing a cylindrical opening 36, and provided in the top wall 14 at respective locations to the rear of, and on opposite sides of, a fore-and-aft centerline extending through the opening 36, are right- and left-hand openings 38 and 40.

Referring now also to FIG. 3, it can be seen that a bearing housing 42 includes a cylindrical flange 44 having a flat, circular mounting surface bolted against a complementary surface provided at the top of the cylindrical pad 34 by a plurality of stud bolts 46. The bearing housing 42 defines a central, cylindrical bore 48 receiving an outer race of each of upper and lower ball bearings 50 separated by a snap ring (not shown), with the lower ball bearing 50 having a lower end surface engaged with a shoulder provided at a lower end of the bore 48. A snap ring 52 is located in an annular groove provided in the bore 48 at a location which results in the ring 52 engaging a top end of the outer bearing race of the upper ball bearing 50. A cutting disk drive shaft 54 is integral with, and projects upwardly from, a disk drive pinion gear 56, the shaft 54 tightly engaging an inner race of each of the bearings 50. Splined onto the top of the shaft 54 is a hub 58 including a substantially square plate 60 containing holes 62 adjacent its four corners provided for having an input drive shaft as well as a cutting knife support disk secured to it by mounting bolts. This input drive shaft would be driven in a direction so as to cause a clockwise rotation to the pinion gear 56, and the attached cutting disk (not shown), as indicated by the direction arrow R so that cut crop material is delivered inwardly along the cutterbar. Extending axially from an upper end of the shaft 54 is a threaded bore which receives a hub-mounting cap screw 64 having a head that acts against a washer 66 engaged with a shoulder provided at the lower end of a cylindrical receptacle 68 surrounding the bolt head.

Formed on the bottom wall 16 of the housing 12 in axial alignment with each of the holes 34 and 36 is a cylindrical pad 70 in which is located a threaded bore 72. An idler gear support shaft 74, having an enlarged head sized for closing the holes 38 and 40 and a threaded lower end, is screwed into each of the threaded bores 72. Located between the head and threaded lower end is an intermediate cylindrical section having a lower shoulder engaged with a top surface of a respective one of the pads 70. Because the module 10 is set up as the leftmost module, only the shaft 74 located in the right-hand hole 34 is used to support an idler gear. Specifically, the inner race of a ball bearing 76 is received on the intermediate cylindrical section of the shaft 74 located in the right-hand hole 38, and mounted for rotating about this shaft 74 is an idler gear 78 containing a central bore receiving an outer race of the bearing 76. The idler gear 78 is meshed with the drive pinion gear 56 and is adapted for being mounted in mesh with a similar idler gear mounted in the left side of a second module and meshed with a further idler gear located in the right side of the second module, which would be bolted to the right side of the module 10 as described above. Thus, power is input to the pinion gear 56 by a drive shaft coupled to the hub 58, and this power is transmitted to the next adjacent module and similarly serially through further modules, through intermeshed idler gears along the remainder of the cutterbar. Pinion gears of the various modules are driven through a selected one of the pair of idlers located within a given module, this selection being made by an eccentric mounting of the bearing housings 42 for supporting the pinion drive shafts in a manner known in the art.

To this point, the structure described is conventional.

The present invention resides in a pinion assembly support pad 80 formed on the bottom wall 16 at a location directly below the drive pinion gear 56 in approximate centered relationship to an axis of rotation of the pinion gear. The pad 80 is approximately triangular in top view, but with rounded corners. For reasons explained below, only a small clearance c exists between the pad 80 and the bottom of the gear 56. The surface area of the top of the pad 80 is quite small and it has been found that it is adequate if the area is no greater than about 10% of the area of a bottom surface of the pinion assembly, and preferably about 5% of the bottom surface of the pinion assembly.

In operation, assuming the cap screw 64 and bearings 50 to respectively be properly tightened and in good condition, the pinion gear 56 will operate spaced from the support pad 80 by the clearance c. Then, if the bearings 50 should wear to the point that the shaft 54 and gear 56 begin to wobble, the support pad 80 will contact the bottom surface of the gear 56 and restrain it from tipping far enough to allow the balls of the bearings 50 to escape into the cutterbar housing 12. Likewise, if the cap screw 60 would become loose and the bearings 50 become worn at the same time to the extent that the shaft 54 falls, the support pad 80 will again engage the bottom of the gear 56 and once again prevent it from lowering far enough to permit the balls of the bearings 50 to escape into the cutterbar housing 12. Because the size of the support pad 80 is small and located centrally below the gear, the velocity of that part of the gear 56 in contact with the support pad 80 is small, and consequently the relative velocity between the gear 56 and the pad 80 is small. The oil in the cutterbar is thus able to provide sufficient lubrication to prevent excessive wear and to dissipate heat.

By eliminating the possibility of the gear 56 from dropping and the bearings 50 from coming apart, internal damage to the cutterbar is greatly reduced. This reduces the time and cost to fix the failed pinion bearings.

Having described the preferred embodiment, it will become apparent that various modifications can be made without departing from the scope of the invention as defined in the accompanying claims.

What is claimed is:

1. In a rotary cutterbar including a gear housing having top and bottom walls and containing a pinion gear joined to a drive shaft received in a bearing assembly contained in a bearing housing mounted to said top wall and normally held in an operating position holding a pinion assembly defined by said pinion gear and drive shaft spaced above said bottom wall and for rotating about an upright axis, the improvement comprising: a pinion assembly support fixed beneath, and in close spatial relationship to a central region of a bottom surface of said pinion assembly and being sized and located so as to serve as a sole support for said bottom surface of said pinion assembly and so as to maintain said pinion assembly in spaced relationship to said bottom wall in the event wear of said bearing assembly occurs and/or said drive shaft mounting loosens so as to permit said drive shaft to wobble and/or drop from its normal operating position, whereby said pinion assembly can continue to operate without disastrous consequences once it engages said pinion assembly support.

2. The rotary cutterbar, as defined in claim 1, wherein said pinion assembly support is defined by a pad formed integrally with said bottom wall of said gear housing.

3. The rotary cutterbar, as defined in claim 1, wherein said pinion assembly support has a surface area, disposed for contact with said bottom surface of said pinion assembly, which is no greater than 10% of an area of said bottom surface of said pinion assembly and is located approximately centrally below said pinion assembly.

4. The rotary cutterbar, as defined in claim 3, wherein said surface area of said pinion assembly support is approximately 5% of said area of said bottom surface of said pinion assembly.

5. The rotary cutterbar, as defined in claim 2, wherein said pad has a contact surface disposed for contacting said bottom surface of said pinion assembly and having an area no greater than 10% of an area of said bottom surface.

6. The rotary cutterbar, as defined in claim 5, wherein said area of said contact surface is approximately 5% of said area of said bottom surface.

7. The rotary cutterbar as defined in claim 2 wherein said pad is substantially triangular.

8. The rotary cutterbar, as defined in claim 5, wherein said pad is approximately centered along said upright axis.

* * * * *